(12) United States Patent  
Yamazaki et al.

(10) Patent No.: US 8,342,100 B2
(45) Date of Patent: Jan. 1, 2013

(54) GAS GENERATOR

(75) Inventors: Masayuki Yamazaki, Hyogo (JP); Naoki Matsuda, Hyogo (JP)

(73) Assignee: Daicel Chemical Industries, Ltd., Osaka-Shi (JP)

( * ) Notice: Subject to any disclaimer, the term of this patent is extended or adjusted under 35 U.S.C. 154(b) by 177 days.

(21) Appl. No.: 13/014,717

(22) Filed: Jan. 27, 2011

(65) Prior Publication Data

US 2011/0179967 A1    Jul. 28, 2011

Related U.S. Application Data

(60) Provisional application No. 61/300,250, filed on Feb. 1, 2010.

(30) Foreign Application Priority Data

Jan. 28, 2010   (JP) .................................. 2010-16770

(51) Int. Cl.
    *C06D 5/00*    (2006.01)
(52) U.S. Cl. ....................... 102/530; 280/741
(58) Field of Classification Search .................. 102/530; 280/741
    See application file for complete search history.

(56) References Cited

U.S. PATENT DOCUMENTS

| | | | |
|---|---|---|---|
| 5,306,041 A * | 4/1994 | Ogawa et al. .................. | 280/741 |
| 5,625,164 A | 4/1997 | McFarland et al. | |
| 5,636,865 A * | 6/1997 | Riley et al. .................... | 280/741 |
| 5,671,946 A * | 9/1997 | Whalen et al. ................. | 280/741 |
| 5,743,556 A * | 4/1998 | Lindsey et al. ............... | 280/736 |
| 2004/0226472 A1 | 11/2004 | Oda | |

FOREIGN PATENT DOCUMENTS

| | | |
|---|---|---|
| EP | 0 589 042 A1 | 3/1994 |
| FR | 2 890 021 A1 | 3/2007 |
| JP | 8-183418 A | 7/1996 |
| JP | 2003-161599 A | 6/2003 |
| WO | WO 2010/109153 A1 | 9/2010 |

OTHER PUBLICATIONS

International Search Report mailed May 18, 2011.
Written Opinion of the International Searching Authority mailed May 18, 2011.

\* cited by examiner

*Primary Examiner* — Gabriel Klein
(74) *Attorney, Agent, or Firm* — Birch, Stewart, Kolasch & Birch, LLP

(57) ABSTRACT

The present invention provides a gas generator including a combustion chamber formed inside a housing having a gas discharge port, a disk-shaped gas generating agent stacked and loaded or a single tubular gas generating agent loaded in the combustion chamber in the axial direction of the housing, an igniter disposed inside the combustion chamber to enclose the igniter and fixed to a bottom surface of the housing by a fixing member,
    the fixing member including a fixing portion for the igniter and a plurality of elastic rod-like gas generating agent support portions extending in the radial direction of the housing from the fixing portion,
    the gas generating agent support portions abutting against a surface of the gas generating agent opposing the bottom surface of the housing, and
    the gas generating agent being pressed and fixed between the gas generating agent support portions and a top surface of the housing.

10 Claims, 6 Drawing Sheets

GAS GENERATOR

This nonprovisional application claims priority under 35 U.S.C. §119(a) to Patent Application No. 2010-16770 filed in Japan on 28 Jan. 2010 and 35 U.S.C. §119(e) to U.S. Provisional Application No. 61/300,250 filed on 1 Feb. 2010, both of which are incorporated by reference.

BACKGROUND OF THE INVENTION

1. Field of the Invention

The present invention relates to a gas generator using a solid gas generating agent and being employed to a restraining device for a vehicle or the like.

2. Description of Related Arts

Gas generators for use in restraining devices such as an airbag apparatus can be of a pyrotechnic gas generator using a solid gas generating agent, a stored gas generator using pressurized gas, and a hybrid gas generator using both of the above. Among these, in a pyrotechnic gas generator, which is advantageous from the standpoint of weight reduction, the surface area of the gas generating agent is strictly controlled to exhibit ignition and combustion of the gas generating agent with good reproducibility.

When a gas generator is assembled or transported, impacts caused by vibrations or the like are applied thereto. In addition, the gas generator installed on a vehicle is constantly subjected to vibrations as the vehicle travels. Therefore, where a solid gas generating agent is gradually powdered under the effect of the impacts and vibrations and the surface area of the gas generating agent increases, the combustion performance thereof changes. In order to avoid these changes, a cushion is disposed inside the combustion chamber to relax the impacts applied to the gas generating agent. An elastic cushion is usually used, and specifications (thickness, number of sheets, etc.) thereof are changed according to the amount of the gas generating agent to be loaded into the combustion chamber.

U.S. Pat. No. 5,625,164 discloses a configuration in which an annular cushion 120 is disposed on a disk-shaped gas generating agent 110. The cushion 120 is disposed in an elastically deformed state between a canister cover 78 and an uppermost disk 110U. Prior to the installation, the cushion 120 has a tapered shape, as shown in FIG. 3. Once installed, the cushion is attached in a state in which the cushion is bent in a bent portion 134 as shown in FIG. 2 and that the thickness in the direction of an axis 40 thereof is decreased.

In U.S. Pat. No. 5,625,164, the cushion 120 is a separate member that is disposed inside the canister after the gas generating agent 110 has been loaded during the assembling operation. However, the orientation of the cushion during assembling can be confused, it is possible to forget to assemble the cushion, and the cushion can be dislocated during the assembling operation.

SUMMARY OF THE INVENTION (Invention 1)

The present invention provides a gas generator including:

a housing having a gas discharge port;

a combustion chamber formed inside the housing;

a disk-shaped gas generating agent stacked and loaded in the combustion chamber in an axial direction of the housing or a single tubular gas generating agent loaded in the combustion chamber aligned in the axial direction of the housing;

an igniter disposed inside the combustion chamber and fixed to a bottom surface of the housing, the gas generating agent loaded to enclose the igniter, the igniter fixed with respect to the bottom surface of the housing by a fixing member, the fixing member including a fixing portion for the igniter and a plurality of elastic rod-like gas generating agent support portions that extend in the radial direction of the housing from the fixing portion, the gas generating agent support portions abutting against a surface of the gas generating agent opposing the bottom surface of the housing, and the gas generating agent being pressed and fixed between the gas generating agent support portions and a top surface of the housing.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
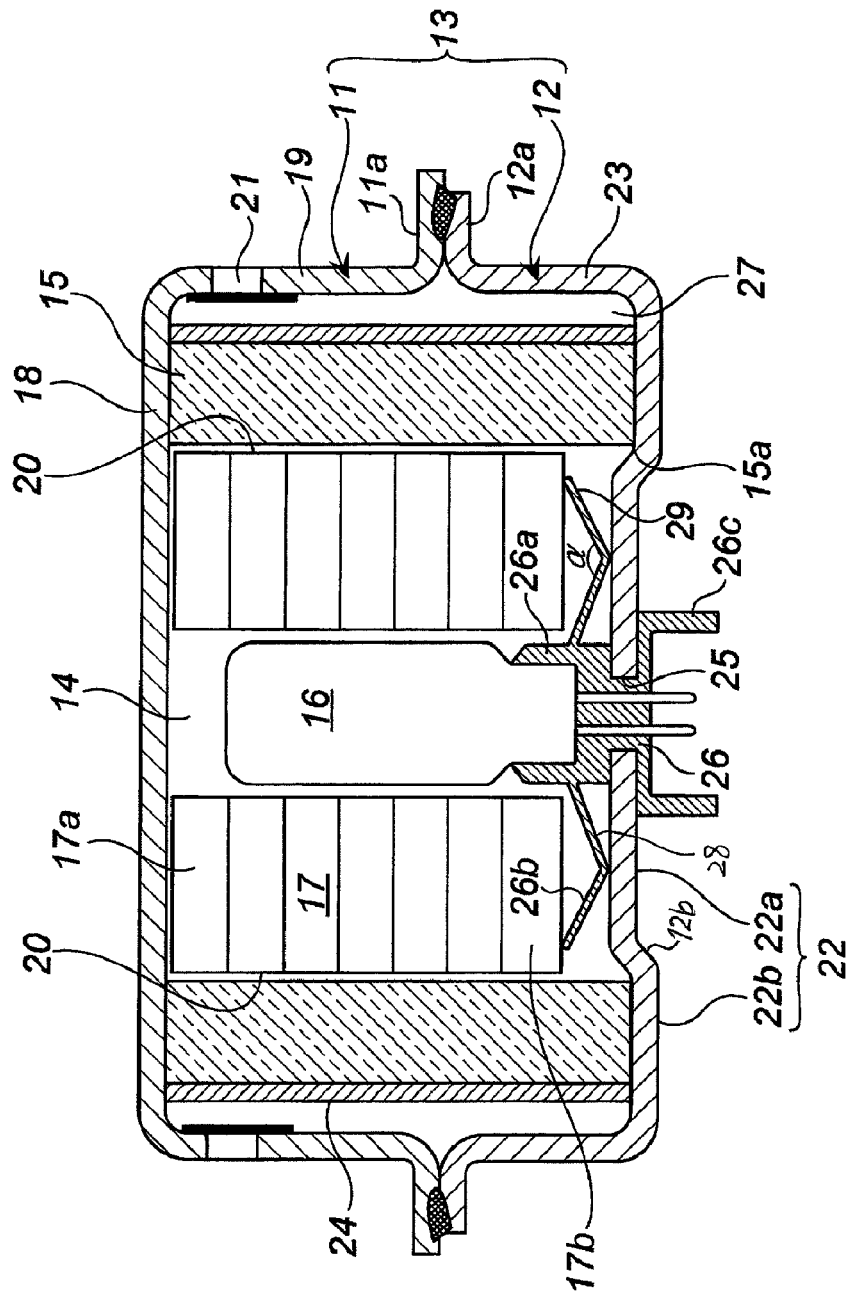
FIG. 1 shows an axial cross-sectional view of the gas generator in accordance with the present invention.

The present invention provides a gas generator that is easy to assemble because it is impossible to misassemble or forget to assemble the components thereof and because the components to be assembled cannot be dislocated during the assembling operation.

The gas generator in accordance with the present invention uses a fixing member for an igniter of a specific shape that has a function of supporting a gas generating agent. Therefore, when the igniter is fixed with respect to the housing, the support member for the gas generating agent is also attached at the same time. Since it is not necessary to attach separately a support member for the gas generating agent, as in U.S. Pat. No. 5,625,164, the number of operations can be reduced, the assembling operation is facilitated, thereby it is impossible to forget to attach the support member for the gas generating agent.

In the gas generator in accordance with the present invention, a tubular filter that has been used in known gas generators can be disposed according to the type (combustion temperature or amount of generated combustion residue) of the gas generating agent. When the tubular filter is used, both end surfaces of the tubular filter abut against the top and bottom surfaces of the housing respectively, and a space bounded by the tubular filter, the top and the bottom surfaces of the housing serves as a combustion chamber.

The gas generating agent support portion of the fixing member has a rod-like shape, but the term "rod-like" means a thin elongated member and places no limitation on the cross sectional shape in the transverse direction. The cross sectional shape of the rod-like member can be round, elliptical or polygonal. In addition to a configuration that is entirely in the form of a thin long plate, a configuration in which at least a portion that supports the gas generating agent has a plate-like shape is preferred. Another advantage of the rod-like shape of the gas generating agent support portion is that the weight can be reduced by comparison with that of a retainer for adjusting the volume of the combustion chamber in accordance with the amount of the gas generating agent, which has been used in the conventional gas generators.

The rod-like gas generating agent support portion is made from an elastic material and a resin or a metal can be used therefore. However, a resin is preferred since a resin support portion can be easily integrally molded with the fixing portion of the fixing member. A resin described in JP-A No. 2003-161599 (paragraph No. 0020) can be used and a nylon resin is preferred.

When the rod-like gas generating agent support portion has a plate-like shape, the width thereof can be about 2 to 8 mm and a thickness can be about 0.5 to 3 mm.

It is preferred that 2 to 4 gas generating agent support portions be formed with equal space, and a configuration in which two gas generating agent support portions are formed to be positioned opposite to each other across the fixing member is preferred.

The gas generating agent may have a disk-like shape, and the thickness of one disk and the number of disks in a stack are not limited. A planar shape of the gas generating agent can be appropriately determined according to the housing shape or the internal structure, but a donut-like shape is preferred because it allows the gas generating agent to be easily disposed so as to enclose the igniter. A single tubular gas generating agent may be also used.

In the gas generating agent in accordance with the present invention, the gas generating agent support portion abuts against the surface of the gas generating agent on the side of the bottom surface of the housing and the abutment surface is pressed by the gas generating agent support portion (pressed so that a pressure is applied in the axial direction). Therefore, the gas generating agent is pressed against and fixed to the top surface of the housing. In order to relax the pressure upon the gas generating agent and increase a force preventing the gas generating agent from powdering on the abutment surface, a combustible sheet may be disposed between the gas generating agent support portion and the gas generating agent. Such a sheet may be also similarly disposed also in the below described inventions.

(Invention 2)

The present invention preferably provides the gas generator according to invention 1, wherein each of the rod-like gas generating agent support portions of the fixing member has a first arm portion extending from the fixing portion for the igniter and a second arm portion extending from the first arm portion, and also has a bent portion between the first arm portion and the second arm portion, only a corner portion of the bent portion abuts against the bottom surface of the housing, and only the second arm portion abuts against the surface of the gas generating agent opposing the bottom surface of the housing.

Since the gas generating agent support portion includes the first arm portion, the bent portion, and the second arm portion, and the bent portion abuts against the bottom surface of the housing, and thereby elasticity of the gas generating agent support portion can be further increased.

The angle of the bent portion formed by the first arm portion and the second arm portion (angle on the side of the top surface of the housing) varies depending on the length ratio of the first arm portion and the second arm portion, but from the standpoint of increasing elasticity, the angle can be selected form the range of 10 to 160°.

Since only the second arm portion is in contact with the gas generating agent, the contact surface area of the gas generating agent support portion and the gas generating agent is decreased. From this standpoint, it is preferred that only the tip portion of the second arm portion be in contact with the gas generating agent.

(Invention 3)

The present invention preferably provides the gas generator according to invention 1, wherein each of the rod-like gas generating agent support portions of the fixing member has a first arm portion extending from the fixing portion for the igniter, a second arm portion extending from the first arm portion, a bent portion between the first arm portion and the second arm portion, and also has a third arm portion extending axially from the second arm portion, only a corner portion of the bent portion abuts against the bottom surface of the housing, the second arm portion abuts against the surface of the gas generating agent opposing the bottom surface of the housing, and the third arm portion abuts against an outer side surface of the gas generating agent in the radial direction of the housing.

The gas generating agent support portion includes the first arm portion, the bent portion, the second arm portion, and the third arm portion. Since the bent portion abuts against the bottom surface of the housing, elasticity of the gas generating agent support portion can be further increased. Further, since the third arm portion abuts against the outer side surface of the gas generating agent in the radial direction, the support function for the gas generating agent is further increased.

(Invention 4)

The present invention preferably provides the gas generator according to invention 1, wherein each of the rod-like gas generating agent support portions of the fixing member has a first arm portion extending from the fixing portion for the igniter, a second arm portion extending from the first arm portion, a bent portion between the first arm portion and the second arm portion, a third arm portion extending axially from the second arm portion, and a fourth (a) arm portion extending from the third arm portion inward in the radial direction of the housing, only a corner portion of the bent portion abuts against the bottom surface of the housing, the second arm portion abuts against the surface of the gas generating agent opposing the bottom surface of the housing, the third arm portion abuts against the outer side surface of the gas generating agent in the radial direction of the housing, and the fourth (a) arm portion abuts against a surface of the gas generating agent opposing the top surface of the housing.

The gas generating agent support portion is include the first arm portion, the bent portion, the second arm portion, the third arm portion, and the fourth (a) arm portion. Since the bent portion abuts against the bottom surface of the housing, elasticity of the gas generating agent support portion can be further increased. Further, since the third arm portion abuts against the outer side surface of the gas generating agent in the radial direction of the housing (direction perpendicular to the axial direction of the housing), the support function for the gas generating agent is further increased. In addition, since the fourth (a) arm portion abuts against the surface of the gas generating agent on the side of the top surface of the housing, the support function for the gas generating agent is further increased.

(Invention 5)

The present invention preferably provides the gas generator according to invention 1, wherein each of the rod-like gas generating agent support portions of the fixing member has a first arm portion extending from the fixing portion for the igniter, a second arm portion extending from the first arm portion, a bent portion between the first arm portion and the second arm portion, a third arm portion extending axially from the second arm portion, and a fourth (b) arm portion extending from the third arm portion outward in the radial direction of the housing, only a corner portion of the bent portion abuts against the bottom surface of the housing, the second arm portion abuts against the surface of the gas generating agent opposing the bottom surface of the housing, the third arm portion abuts against an outer side surface of the gas generating agent in the radial direction of the housing, and the fourth (b) arm portion abuts against the top surface of the housing.

The gas generating agent support portion includes the first arm portion, the bent portion, the second arm portion, the third arm portion, and the fourth (b) arm portion. Since the bent portion abuts against the bottom surface of the housing, elasticity of the gas generating agent support portion can be further increased. Further, since the third arm portion abuts against the outer side surface of the gas generating agent in the radial direction of the housing, the support action of the gas generating agent is further increased.

In addition, since the fourth (b) arm portion abuts against the top surface of the housing, the fixing strength of the gas generating agent support portion itself is increased, thereby further increasing the support function for the gas generating agent by the gas generating agent support portion itself.

(Invention 6)

The present invention preferably provides the gas generator according to invention 5, wherein a tubular filter is disposed inside the housing, the combustion chamber is formed inside the tubular filter, the fourth (b) arm portion of each of the gas generating agent support portions is disposed in contact with both one end surface of the tubular filter and the top surface of the housing.

In the gas generator requiring a tubular filter, the space bounded by the tubular filter, the top surface of the housing, and the bottom surface of the housing becomes a combustion chamber. Since the fourth (b) arm portion of the gas generating agent support portion is in contact with both one end surface of the tubular filter and the top surface of the housing, the fixing strength of the gas generating agent support portion itself is increased, thereby further increasing the support function for the gas generating agent by the gas generating agent support portion itself.

(Invention 7)

The present invention preferably provides the gas generator according to invention 1, wherein each of the rod-like gas generating agent support portions of the fixing member has a first arm portion extending from the fixing portion for the igniter, a second arm portion extending from the first arm portion, and a curved portion between the first arm portion and the second arm portion, the first arm portion and the second arm portion abut against the bottom surface of the housing, and only a curved surface of the curved portion abuts against the surface of the gas generating agent opposing the bottom surface of the housing.

The gas generating agent support portion includes the first arm portion, the curved portion, and the second arm portion, the first arm portion and the second arm portion abut against the bottom surface of the housing to support the gas generating agent support portion itself, and only a curved surface of the curved portion abuts against the surface of the gas generating agent opposing the bottom surface of the housing. Therefore, the abutment surface is pressed in the axial direction (towards the housing top surface).

This configuration is also advantageous in that the contact surface area of the gas generating agent support portion and the gas generating agent is small because only the curved surface of the curved portion is in contact with the gas generating agent.

(Invention 8)

The present invention preferably provides the gas generator according to invention 1, wherein each of the rod-like gas generating agent support portions of the fixing member has a first arm portion extending from the fixing portion for the igniter, a second arm portion extending from the first arm portion, a curved portion between the first arm portion and the second arm portion, and a third arm portion extending axially from the second arm portion, the first arm portion and the second arm portion abut against the bottom surface of the housing, only a curved surface of the curved portion abuts against the surface of the gas generating agent opposing the bottom surface of the housing, and the third arm portion abuts against an outer side surface of the gas generating agent in the radial direction of the housing.

The gas generating agent support portion includes the first arm portion, the curved portion, the second arm portion, and the third arm portion. The first arm portion and the second arm portion abut against the bottom surface of the housing, thereby the gas generating agent support portion itself is supported, and only a curved surface of the curved portion abuts against the surface of the gas generating agent opposing the bottom surface of the housing, thereby the abutment surface is pressed.

Further, since the third arm portion abuts against the outer side surface of the gas generating agent in the radial direction of the housing (in the direction perpendicular to the axial direction of the housing), the support function for the gas generating agent is further increased.

(Invention 9)

The present invention preferably provides the gas generator according to invention 1, wherein each of the rod-like gas generating agent support portions of the fixing member has a first arm portion extending from the fixing portion for the igniter, a second arm portion extending from the first arm portion, a curved portion between the first arm portion and the second arm portion, a third arm portion extending axially from the second arm portion, and a fourth (a) arm portion extending outward in the radial direction of the housing from part of the third arm portion on the side of the bottom surface of the housing, the first arm portion and the second arm portion abut against the bottom surface of the housing, only a curved surface of the curved portion abuts against the surface of the gas generating agent opposing the bottom surface of the housing, the third arm portion abuts against an outer side surface of the gas generating agent in the radial direction of the housing, and the fourth (a) arm portion abuts against the bottom surface of the housing.

The gas generating agent support portion includes the first arm portion, the curved portion, the second arm portion, the third arm portion, and the fourth (a) arm portion. The first arm portion and the second arm portion abut against the bottom surface of the housing, thereby the gas generating agent support portion itself is supported, and only a curved surface of the curved portion abuts against the surface of the gas generating agent opposing the bottom surface of the housing, thereby the abutment surface is pressed. Further, since the third arm portion abuts against the outer side surface of the gas generating agent in the radial direction of the housing, the support function for the gas generating agent is further increased.

In addition, since the fourth (a) arm portion abuts against the bottom surface of the housing, a contact surface area of the gas generating agent support portion and the housing is increased and the fixing strength of the gas generating agent support portion itself is increased. As a result, the support strength for the gas generating agent by the gas generating agent support portion is increased.

(Invention 10)

The present invention preferably provides the gas generator according to invention 1, wherein a tubular filter is disposed inside the housing, the combustion chamber is formed inside the tubular filter, each of the rod-like gas generating agent support portions of the fixing member has a first arm portion extending from the fixing portion for the igniter, a second arm portion extending from the first arm portion, a curved portion between the first arm portion and the second arm portion, a third arm portion extending axially from the second arm portion, a fourth (a) arm portion extending outward in the radial direction of the housing from part of the third arm portion on the side of the bottom surface of the housing, and a fourth (b) arm portion extending from the fourth (a) arm portion in the axial direction of the housing, the first arm portion and the second arm portion abut against the bottom surface of the housing, only a curved surface of the curved portion abuts against the surface of the gas generating agent opposing the bottom surface of the housing, the third arm portion abuts against an outer side surface of the gas generating agent in the radial direction of the housing, and an end surface and a circumferential surface of the tubular filter on the side of the bottom surface of the housing are supported by the third arm portion, the fourth (a) arm portion, and the fourth (b) arm portion.

The gas generating agent support portion includes the first arm portion, the curved portion, the second arm portion, the third arm portion, the fourth (a) arm portion, and the fourth (b) arm portion. The first arm portion and the second arm portion abut against the bottom surface of the housing, thereby the gas generating agent support portion itself is supported, and only a curved surface of the curved portion abuts against the surface of the gas generating agent opposing the bottom surface of the housing, thereby the abutment surface is pressed. Further, since the third arm portion abuts against the outer side surface of the gas generating agent in the radial direction of the housing, the support function for the gas generating agent is further increased.

In addition, since the fourth (a) arm portion abuts against the bottom surface of the housing, a contact surface area of the gas generating agent support portion and the housing is increased and the fixing strength of the gas generating agent support portion itself is increased. As a result, the support strength for the gas generating agent by the gas generating agent support portion is increased.

Further, since an end surface of the tubular filter on the side of the bottom surface of the housing is supported by the third arm portion, the fourth (a) arm portion, and the fourth (b) arm portion, the filter support function is increased.

With the gas generator in accordance with the present invention, it is possible to reduce the number of parts, while maintaining the gas generating agent holding performance, and facilitate the assembling operation. Therefore, it is possible to provide a gas generator that is easy to produce and demonstrates stable performance.

Preferred Embodiments of Invention (1) Gas Generator Shown in FIG. 1

FIG. 1 is an axial sectional view of a gas generator for an airbag that is an embodiment of the present invention. This gas generator uses an igniter fixing member shown in FIG. 2.

In the gas generator shown in FIG. 1, a housing 13 is formed by a diffuser shell 11 and a closure shell 12.

The diffuser shell 11 is formed by pressing an iron plate and has a top surface (top surface of the housing) 18, a circumferential wall portion 19 formed on the outer circumference of the top surface, and a flange portion 11a extending radially outward at the distal end portion of the circumferential wall potion. A plurality of gas discharge ports 21 are formed equidistantly in the circumferential direction in the circumferential wall portion 19. The gas discharge ports 21 are sealed from inside with a seal tape.

The closure shell 12 is formed by pressing an iron sheet and has a bottom surface (bottom surface of the housing) 22, a circumferential wall portion 23 formed on the outer circumference of the bottom surface, and a flange portion 12a extending radially outward at the distal end portion of the circumferential wall potion. A step 12b is formed at the bottom surface 22 of the housing, and a circular bottom surface 22a of the central portion and an annular bottom surface 22b are formed with the step 12b serving as a boundary. A central hole 25 is formed in the circular bottom surface 22a, and an igniter 16 is fixed by a fixing member 26 to the circular bottom surface 22a.

The flange portions 11a, 12a are stacked and welded together to join the diffuser shell 11 and the closure shell 12.

A filter 15 is disposed concentrically with the central hole 25 and has a tubular shape. A lower end inner circumferential edge 15a of the filter 15 abuts against the step 12b of the closure shell 12 to have a fixed position. A known filter can be used. The filter is disposed so that a gap 27 is formed between the filter and the circumferential wall portions 19, 23 of the housing 13. A tubular filter-supporting member 24 having multiple holes is disposed on the outside of the filter 15. Where a gas generating agent 17 has a low combustion temperature and hardly generates combustion residues, the filter 15 and the filter-supporting member 24 can be omitted.

The combustion chamber 14 is bounded by the housing 13 and the filter 15, and an igniter 16 and a donut-shaped solid gas generating agent 17 are disposed inside the combustion chamber.

The igniter 16 is a conventionally-used electric igniter actuated by a signal from a sensor (not shown in the drawing). A combination of an electric igniter and a transfer charge such as described in JP-A No. 8-183418 may be used as the igniter.

The donut-shaped gas generating agent 17 is loaded such that a plurality of plates of the gas generating agent are stacked. The igniter 16 is inserted into a tubular space formed by holes of a plurality of gas generating agents 17 (thus, the gas generating agent 17 is disposed so as to surround the igniter 16).

The two end surfaces of the filter 15 abut against the top surface 18 of the housing and the bottom surface 22 (annular bottom surface 22b) of the housing, without a gap. If necessary, a short passing-preventing function for the combustion product can be enhanced by inserting a known sealing member between the abutting surfaces. The combustion gas is prevented from short passing between the filter 15 and the top surface 18 or the bottom surface 22 of the housing.

The fixing member 26 has a fixing portion 26a, a gas generating agent support portion 26b in the form of a thin elongated plate, and a connector receptacle 26c that receives a connector for connection to the igniter 16. The fixing member 26 is formed integrally in a state in which the igniter 16 is fixed by injection molding a nylon resin. The fixing member 26 is fixed with respect to the central hole 25.

The gas generating agent support portion 26b has a first arm portion 28 extending from the fixing portion 26a to the bottom surface 22 of the housing and a second arm portion 29 extending from the first arm portion 28 in the direction of the top surface 18 of the housing. And a bent portion 30 is present between the first arm portion 28 and the second arm portion 29.

The first arm portion 28 and the second arm portion 29 are formed in mutually opposing directions, with respect to the bent portion 30 being interposed therebetween. An angle α (angle on the side of the top surface 18 of the housing) of the bent portion 30 formed by the first arm portion 28 and the second arm portion 29 is within a range of 100-160°.

The first arm portion 28 and the second arm portion 29 may have the same length or different lengths, and the angle of the bent portion 30 can be adjusted by adjusting the length ratio thereof. The length of the first arm portion 28 shown in FIG. 1 is 2 to 30 mm, the length of the second arm portion 29 is 2 to 30 mm, and the both arm portions have the thickness of 0.5 to 3 mm and the width of 2 to 8 mm.

In the gas generating agent support portion 26b, only a corner portion of the bent portion 30 abuts against the housing circular bottom surface 22a, and only a tip portion 29a of the second arm portion 29 abuts against the surface of the gas generating agent 17b of the lowermost layer (the layer closest to the bottom surface 22 of the housing). In this state, the tip portion 29a of the second arm portion presses the surface of the gas generating agent 17b in the axial direction (direction of the top surface 18 of the housing) due to elasticity of the gas generating agent support portion 26b. Thereby, the gas generating agent 17a of the uppermost layer is also pressed towards the top surface 18 of the housing. Therefore, even when there are two gas generating agent support portions 26b, the gas generating agent 17 is fixed inside the combustion chamber 14.

In FIG. 1, the second arm portion 29 can be bent so that the first arm portion 28 extends towards the bottom surface 22 of the housing, the bent portion 30 abuts against the housing circular bottom surface 22a, and the angle α of the bent portion 30 is within a range of from 10° to less than 90°, preferably 10 to 40°. In such an embodiment, the tip portion 29a of the second arm portion 29 also abuts against the surface of the gas generating agent 17b. However, the abutment portion of the second arm portion 29 becomes the rear surface of the tip portion in a state shown in FIG. 1.

Further, in FIG. 1, such an embodiment can be also realized that the first arm portion 28 extends towards the top surface 18 of the housing, the second arm portion 29 extends towards the bottom surface 22 of the housing, and the bent portion 30 is formed therebetween. In this embodiment, the corner portion of the bent portion 30 abuts the surface of the gas generating agent 17b, and the tip portion 29a of the second arm portion 29 abuts against the bottom surface 22 of the housing.

The gas generator shown in FIG. 1 is assembled in the following manner.

First, the igniter 16 and the fixing member 26 are attached to the hole 25 of the closure shell 12 by integrating the igniter 16 and the fixing member 26 with a resin.

Then, the closure shell 12 is placed on a horizontal surface so that the bottom surface 22 of the housing faces down.

The filter 15 is then placed in a predetermined position and the gas generating agent 17 is stacked and loaded in the inner space of the filter. In this case, the gas generating agent 17b comes into contact with the tip portion 29a of the second arm portion 29.

The diffuser shell 11 is then placed on the closure shell and the flanges 11a, 12a are welded. Once the above-described process is completed, the stacked and loaded gas generating agent 17 is fixed in a state of being pressed from both sides (in the vertical direction in the drawing) by the gas generating agent support portion 26b (second arm portion 29) and the top surface 18 of the housing.

The gas generating agent support portion 26b performs a function corresponding to that of the conventional cushion member, but it is different from the conventional cushion member regarding the unification of the fixing member 26 and the gas generating agent support portion 26b. Therefore, by contrast with the case in which separate parts are assembled, no missing parts nor erroneous orientation in assembling is occurred. Furthermore, even when the closure shell 12 is reversed in the course of the assembling operation, the fixing member 26 is not dislocated and thus the gas generator is easily assembled.

In the gas generator shown in FIG. 1, the igniter 16 is actuated by a signal from a collision sensor (not shown in the drawing), and the gas generating agent 17 is ignited and starts burning. The high-temperature combustion gas generated thereby passes through the filter 15 and is cooled, filtered and discharged through the gap 27 via the gas discharge port 21.

Figure 3:
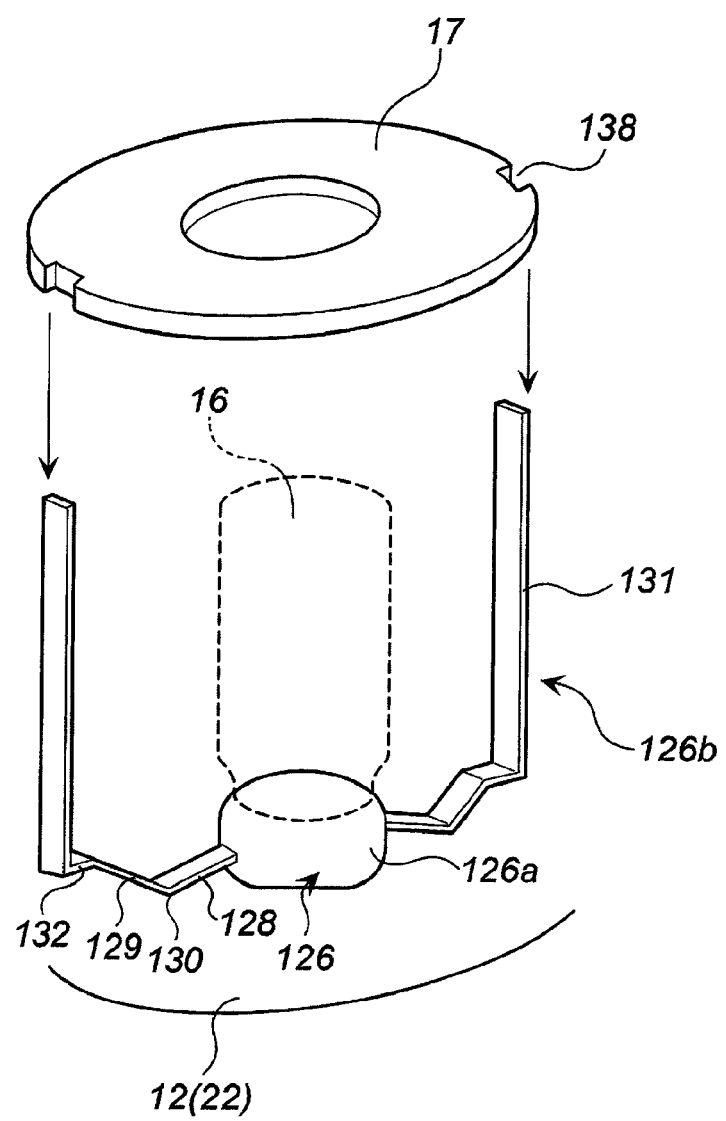
FIG. 3 shows a perspective view of the igniter fixing member of an embodiment other than that shown in FIG. 2.

(2) Fixing Member Shown in FIG. 3.

Figure 2:
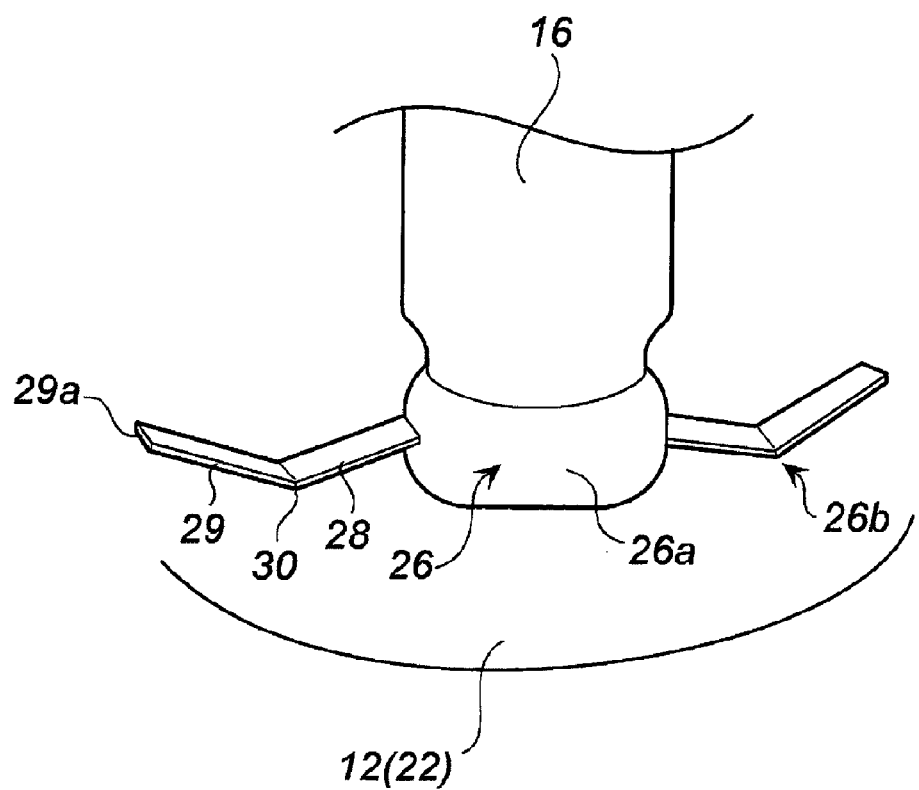
FIG. 2 shows a perspective view of the igniter fixing member used in FIG. 1.

FIG. 3 is a perspective view illustrating another embodiment of the fixing member 26 shown in FIG. 2.

Similarly to the fixing member 26, shown in FIG. 2, the fixing member 126 has a fixing portion 126a, a gas generating agent support portion 126b having a thin elongated plate-like shape, and a connector receptacle (not shown in the drawing) that receives a connector connected to the igniter 16.

The gas generating agent support portion 126b has a first arm portion 128 extending from the fixing portion 126a to the bottom surface 22 of the housing and a second arm portion 129 extending from the first arm portion 128 towards the top surface 18 of the housing (see FIG. 1). And a bent portion 130 is present between the first arm portion 128 and the second arm portion 129. The fixing member also has a third arm portion 131 extending axially from the second arm portion 129 (in the direction of the top surface 18 of the housing when assembled in the gas generator, similarly to the configuration shown in FIG. 1). As shown in FIG. 3, a short connection portion (tip portion of the second arm portion 129) 132 is formed between the second arm portion 129 and the third arm portion 131, and the connection portion 132 abuts against the gas generating agent 17b.

When the fixing member 126 shown in FIG. 3 is attached in the same manner as the fixing member 26 shown in FIG. 1, the third arm portion 131 abuts against a side surface 20 of the gas generating agent 17 and thus functions to support the entire gas generating agent 17.

It is preferred that a notch 138 be formed in a portion of the gas generating agent 17 that is in contact with the third arm portion 131 as shown in the configuration shown in FIG. 3 because the notch increases the support for the gas generating agent 17 by the third arm 131.

Figure 4:
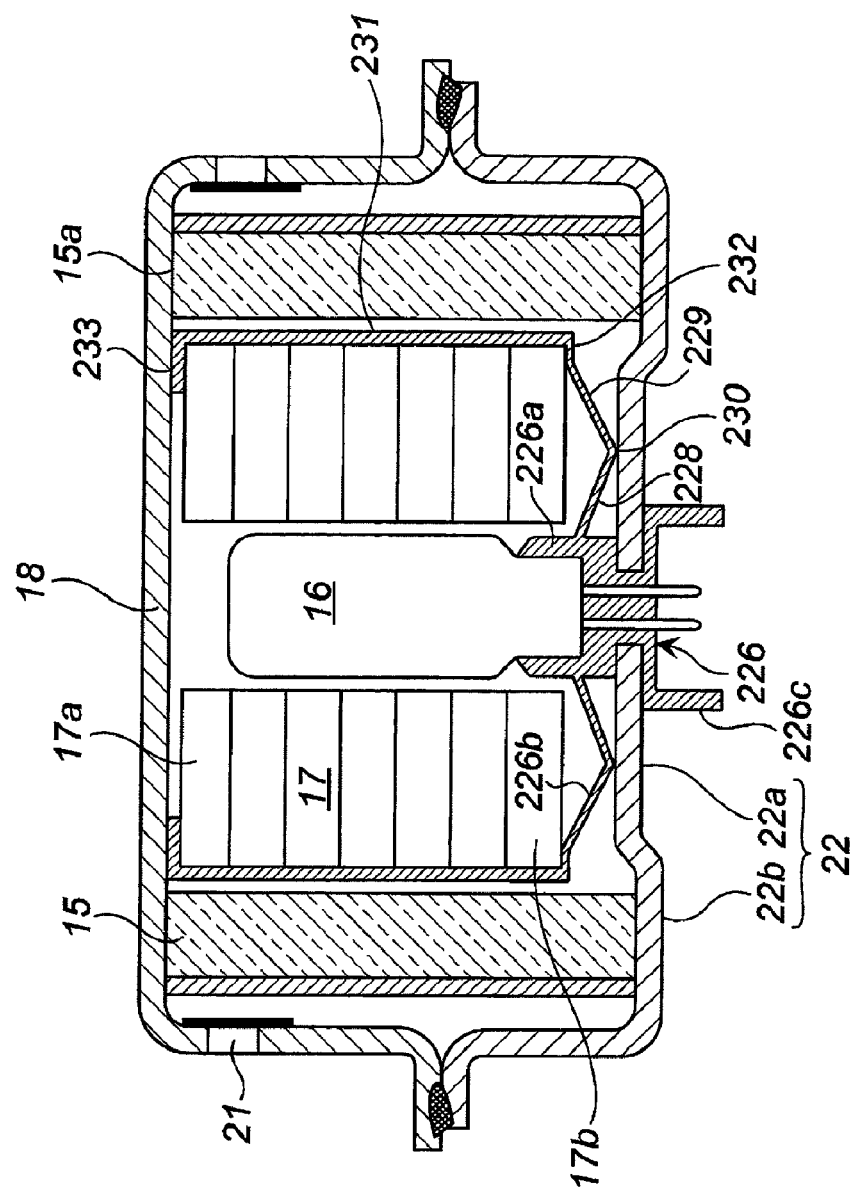
FIG. 4 shows an axial sectional view of a gas generator of an embodiment other than that shown in FIG. 1.

(3) Gas Generator Shown in FIG. 4

FIG. 4 shows an embodiment of another fixing member 226, which is an improvement of the fixing member 126 shown in FIG. 3.

The fixing member 226 has a fixing portion 226*a*, a gas generating agent support portion 226*b* having a thin elongated plate-like shape, and a connector receptacle 226*c* that receives a connector connected to the igniter 16.

The gas generating agent support portion 226*b* has a first arm portion 228 extending from the fixing portion 226*a* to the bottom surface 22 of the housing and a second arm portion 229 extending from the first arm portion 228 towards the top surface 18 of the housing. And a bent portion 230 is present between the first arm portion 228 and the second arm portion 229.

The fixing member also has a third arm portion 231 extending axially (in the direction of the top surface 18 of the housing) from the second arm portion 229. As shown in FIG. 4, a short connection portion (tip portion of the second arm portion 229) 232 is formed between the second arm portion 229 and the third arm portion 231, and the connection portion 232 abuts against the gas generating agent 17*b*.

The fixing member 226 shown in FIG. 4 also has a fourth (a) arm portion 233 extending radially inward of the housing from the third arm portion 231. The fourth (a) arm portion 233 is inserted between the gas generating agent 17*a* of the uppermost layer and the top surface 18 of the housing.

Where the fixing member 226 shown in FIG. 4 is used, the stacked and loaded gas generating agent 17 is fixed in a state of being pressed from both sides (in the vertical direction in the drawing) by the connection portion (tip portion of the second arm portion 229) 232 and the fourth (a) arm portion 233 of the gas generating agent support portion 226*a*, and the side surface 20 of the gas generating agent 17 is supported by the third arm portion 231.

Figure 5:
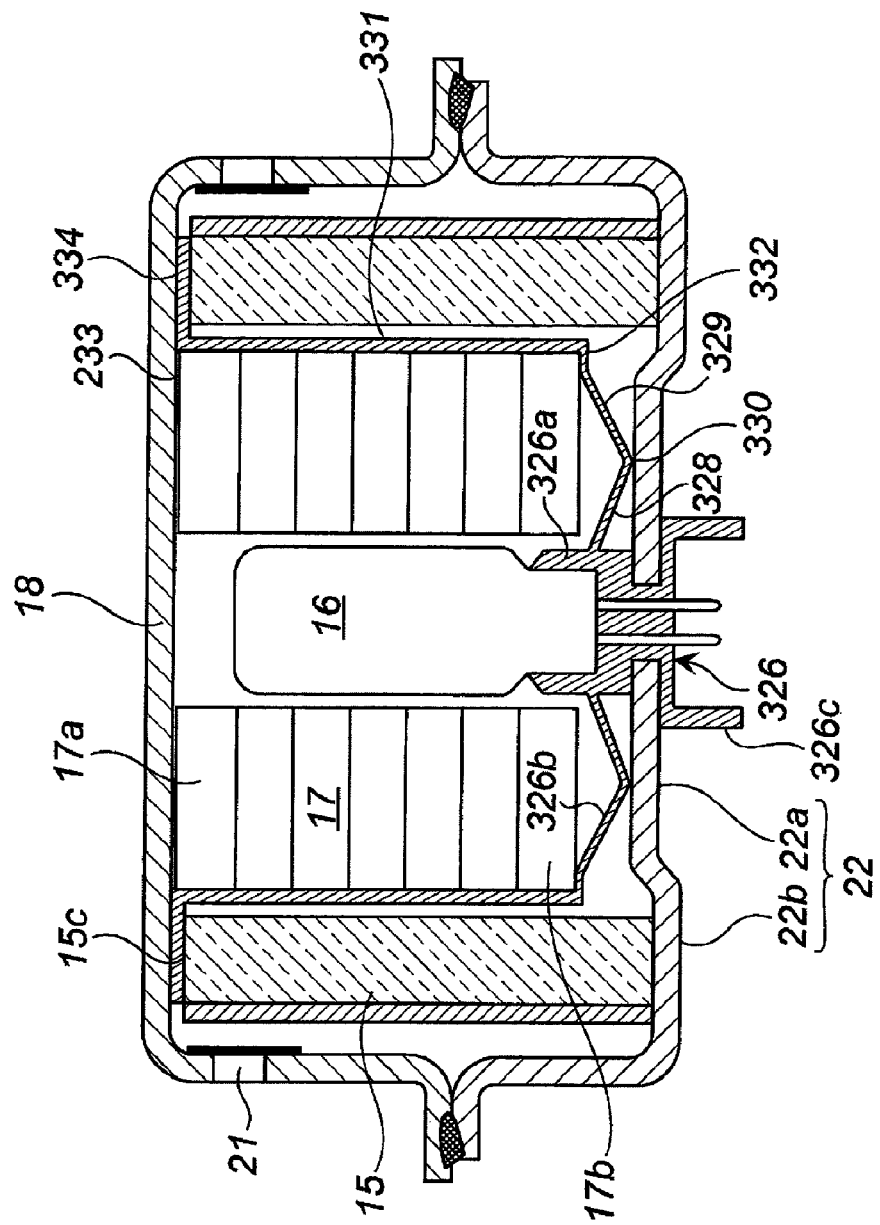
FIG. 5 shows an axial sectional view of a gas generator of an embodiment other than that shown in FIG. 1.

(4) Gas Generator Shown in FIG. 5

FIG. 5 shows an embodiment of another fixing member 326, which is an improvement of the fixing member 126 shown in FIG. 3.

The fixing member 326 has a fixing portion 326*a*, a gas generating agent support portion 326*b* having a thin elongated plate-like shape, and a connector receptacle 326*c* that receives a connector connected to the igniter 16.

The gas generating agent support portion 326*b* has a first arm portion 328 extending from the fixing portion 326*a* to the bottom surface 22 of the housing and a second arm portion 329 extending from the first arm portion 328 towards the top surface 18 of the housing. And a bent portion 330 is present between the first arm portion 328 and the second arm portion 329.

The fixing member also has a third arm portion 331 extending axially (in the direction of the top surface 18 of the housing) from the second arm portion 329. As shown in FIG. 5, a short connection portion (tip portion of the second arm portion 329) 332 is formed between the second arm portion 329 and the third arm portion 331, and the connection portion 332 abuts against the gas generating agent 17*b*.

The fixing member 326 shown in FIG. 5 also has a fourth (b) arm portion 334 extending radially outward of the housing from the third arm portion 331. The fourth (b) arm portion 334 is inserted between an end surface 15*c* of the filter 15 and the top surface 18 of the housing.

Where the fixing member 326 shown in FIG. 5 is used, the stacked and loaded gas generating agent 17 is fixed in a state of being pressed from both sides (in the vertical direction in the drawing) by the connection portion (tip portion of the second arm portion 329) 332 of the gas generating agent support portion 326*b* and the top surface 18 of the housing, and the side surface 20 of the gas generating agent 17 is supported by the third arm portion 331.

Figure 6:
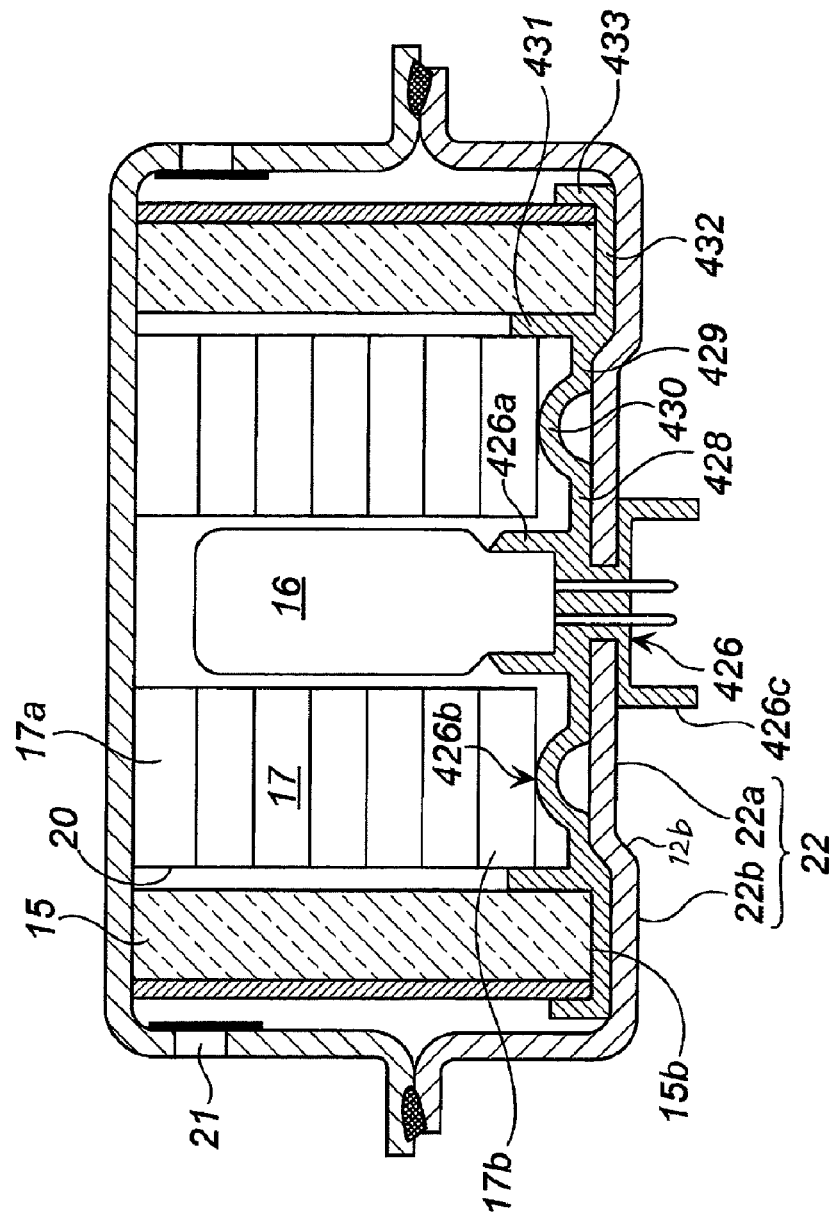
FIG. 6 shows an axial sectional view of a gas generator of an embodiment other than that shown in FIG. 1.

(5) Gas Generator Shown in FIG. 6

FIG. 6 shows a gas generator using a fixing member of an embodiment different from that of the fixing members shown in FIGS. 1 to 5.

A fixing member 426 has a fixing portion 426*a*, a gas generating agent support portion 426*b* having a thin elongated plate-like shape, and a connector receptacle 426*c* that receives a connector connected to the igniter 16.

The gas generating agent support portion 426*b* has a first arm portion 428 and a second arm portion 429 extending from the fixing portion 426*a*. And a curved portion 430 is present between the first arm portion 428 and the second arm portion 429.

The fixing member also has a third arm portion 431 extending axially from the second arm portion 429, a fourth (a) arm portion 432 extending radially outward of the housing from a portion of the third arm portion 431 on the side of the bottom surface 22 of the housing, and a fourth (b) arm portion 433 extending in the axial direction of the housing from the fourth (a) arm portion 432. The portions of the second arm portion 429 and the fourth (a) arm portion 432 that are in contact with the bottom surface 22 of the housing (the round bottom portion 22*a*, the step 12*b*, and the annular bottom surface 22*b*) have a shape matching that of the bottom surface 22 of the housing.

The first arm portion 428 and the second arm portion 429 abut against the bottom surface of the housing, only the curved surface of the curved portion 430 abuts against the surface of the gas generating agent 17*b*, and the third arm portion 431 abuts against the outer side surface 20 of the gas generating agent 17*a*. The tubular filter 15 is supported on the end surface 15*b* side by the third arm portion 431, the fourth (a) arm portion 432, and the fourth (b) arm portion 433.

Where the fixing member 426 shown in FIG. 6 is used, the stacked and loaded gas generating agent 17 is fixed in a state of being pressed from both sides (in the vertical direction in the drawing) by the curved surface of the curved portion 430 of the gas generating agent support portion 426*b* and the top surface 18 of the housing, and the side surface 20 of the gas generating agent 17 is supported by the third arm portion 431.

Further, since the fourth (a) arm portion 432 is in a state of being sandwiched and fixed by a filter end surface 15*b* and the bottom surface 22 of the housing, the fixing strength of the entire gas generating agent support portion 426*b* is increased. Therefore, the support strength for the gas generating agent 17 is also increased. In addition, since the filter end surface 15*b* is supported by the third arm portion 431, fourth (a) arm portion 432, and fourth (b) arm portion 433, the support action of the filter is increased.

In all of the above-described embodiments, the application to a gas generator using a filter is described. However, from the standpoint of holding the gas generating agent, which is the purpose of the present invention, the present invention can be also implemented in a conventional pyrotechnic gas generator using no filter or coolant.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
a housing having a gas discharge port;
a combustion chamber formed inside the housing;
a disk-shaped gas generating agent stacked and loaded in the combustion chamber in an axial direction of the housing or a single tubular gas generating agent loaded in the combustion chamber aligned in the axial direction of the housing;
an igniter disposed inside the combustion chamber and fixed to a bottom surface of the housing,
the gas generating agent loaded to enclose the igniter, the igniter fixed with respect to the bottom surface of the housing by a fixing member,
the fixing member including a fixing portion for the igniter and a plurality of elastic rod-like gas generating agent support portions that extend in the radial direction of the housing from the fixing portion,
the gas generating agent support portions abutting against a surface of the gas generating agent opposing the bottom surface of the housing, and
the gas generating agent being pressed and fixed between the gas generating agent support portions and a top surface of the housing.

2. The gas generator according to claim 1, wherein
each of the rod-like gas generating agent support portions of the fixing member has a first arm portion extending from the fixing portion for the igniter and a second arm portion extending from the first arm portion, and also has a bent portion between the first arm portion and the second arm portion,
only a corner portion of the bent portion abuts against the bottom surface of the housing, and
only the second arm portion abuts against the surface of the gas generating agent opposing the bottom surface of the housing.

3. The gas generator according to claim 1, wherein
each of the rod-like gas generating agent support portions of the fixing member has a first arm portion extending from the fixing portion for the igniter, a second arm portion extending from the first arm portion, a bent portion between the first arm portion and the second arm portion, and also has a third arm portion extending axially from the second arm portion,
only a corner portion of the bent portion abuts against the bottom surface of the housing,
the second arm portion abuts against the surface of the gas generating agent opposing the bottom surface of the housing, and
the third arm portion abuts against an outer side surface of the gas generating agent in the radial direction of the housing.

4. The gas generator according to claim 1, wherein
each of the rod-like gas generating agent support portions of the fixing member has a first arm portion extending from the fixing portion for the igniter, a second arm portion extending from the first arm portion, a bent portion between the first arm portion and the second arm portion, a third arm portion extending axially from the second arm portion, and a fourth (a) arm portion extending from the third arm portion inward in the radial direction of the housing,
only a corner portion of the bent portion abuts against the bottom surface of the housing,
the second arm portion abuts against the surface of the gas generating agent opposing the bottom surface of the housing,
the third arm portion abuts against the outer side surface of the gas generating agent in the radial direction of the housing, and
the fourth (a) arm portion abuts against a surface of the gas generating agent opposing the top surface of the housing.

5. The gas generator according to claim 1, wherein
each of the rod-like gas generating agent support portions of the fixing member has a first arm portion extending from the fixing portion for the igniter, a second arm portion extending from the first arm portion, a bent portion between the first arm portion and the second arm portion, a third arm portion extending axially from the second arm portion, and a fourth (b) arm portion extending from the third arm portion outward in the radial direction of the housing,
only a corner portion of the bent portion abuts against the bottom surface of the housing,
the second arm portion abuts against the surface of the gas generating agent opposing the bottom surface of the housing,
the third arm portion abuts against an outer side surface of the gas generating agent in the radial direction of the housing, and
the fourth (b) arm portion abuts against the top surface of the housing.

6. The gas generator according to claim 5, wherein a tubular filter is disposed inside the housing, the combustion chamber is formed inside the tubular filter, the fourth (b) arm portion of each of the gas generating agent support portions is disposed in contact with both one end surface of the tubular filter and the top surface of the housing.

7. The gas generator according to claim 1, wherein
each of the rod-like gas generating agent support portions of the fixing member has a first arm portion extending from the fixing portion for the igniter, a second arm portion extending from the first arm portion, and a curved portion between the first arm portion and the second arm portion,
the first arm portion and the second arm portion abut against the bottom surface of the housing, and
only a curved surface of the curved portion abuts against the surface of the gas generating agent opposing the bottom surface of the housing.

8. The gas generator according to claim 1, wherein
each of the rod-like gas generating agent support portions of the fixing member has a first arm portion extending from the fixing portion for the igniter, a second arm portion extending from the first arm portion, a curved portion between the first arm portion and the second arm portion, and a third arm portion extending axially from the second arm portion,
the first arm portion and the second arm portion abut against the bottom surface of the housing,
only a curved surface of the curved portion abuts against the surface of the gas generating agent opposing the bottom surface of the housing, and
the third arm portion abuts against an outer side surface of the gas generating agent in the radial direction of the housing.

9. The gas generator according to claim 1, wherein
each of the rod-like gas generating agent support portions of the fixing member has a first arm portion extending from the fixing portion for the igniter, a second arm portion extending from the first arm portion, a curved portion between the first arm portion and the second arm portion, a third arm portion extending axially from the second arm portion, and a fourth (a) arm portion extending outward in the radial direction of the housing from part of the third arm portion on the side of the bottom surface of the housing, the first arm portion and the second arm portion abut against the bottom surface of the housing, only a curved surface of the curved portion abuts against the surface of the gas generating agent opposing the bottom surface of the housing, the third arm portion abuts against an outer side surface of the gas generating agent in the radial direction of the housing, and the fourth (a) arm portion abuts against the bottom surface of the housing.

10. The gas generator according to claim 1, wherein a tubular filter is disposed inside the housing, the combustion chamber is formed inside the tubular filter, each of the rod-like gas generating agent support portions of the fixing member has a first arm portion extending from the fixing portion for the igniter, a second arm portion extending from the first arm portion, a curved portion between the first arm portion and the second arm portion, a third arm portion extending axially from the second arm portion, a fourth (a) arm portion extending outward in the radial direction of the housing from part of the third arm portion on the side of the bottom surface of the housing, and a fourth (b) arm portion extending from the fourth (a) arm portion in the axial direction of the housing, the first arm portion and the second arm portion abut against the bottom surface of the housing, only a curved surface of the curved portion abuts against the surface of the gas generating agent opposing the bottom surface of the housing, the third arm portion abuts against an outer side surface of the gas generating agent in the radial direction of the housing, and an end surface and a circumferential surface of the tubular filter on the side of the bottom surface of the housing are supported by the third arm portion, the fourth (a) arm portion, and the fourth (b) arm portion.

* * * * *